(12) United States Patent
Kim et al.

(10) Patent No.: US 7,247,378 B2
(45) Date of Patent: Jul. 24, 2007

(54) UV-SCATTERING INORGANIC/POLYMER COMPOSITE PARTICLES AND A METHOD FOR PREPARING THE SAME

(75) Inventors: Jin Woong Kim, Yongin-shi (KR); Jong Won Shim, Seoul (KR); Young Ha Lee, Suwon-shi (KR); Han Kon Kim, Suwon-shi (KR); Hak Hee Kang, Seongnam-shi (KR)

(73) Assignee: Amorepacific Corporation, Kyung Bae, Seo ( * ) Notice: Subject to any disclaimer, the term of this patent is extended or adjusted under 35 U.S.C. 154(b) by 0 days.

(21) Appl. No.: 10/157,987

(22) Filed: May 31, 2002

(65) Prior Publication Data
US 2003/0091824 A1    May 15, 2003

(30) Foreign Application Priority Data
Aug. 29, 2001 (KR) .............................. 2001-52494

(51) Int. Cl.
*B32B 5/16* (2006.01)
*B32B 9/00* (2006.01)

(52) U.S. Cl. ................. 428/404; 428/403; 428/407

(58) Field of Classification Search ............... 428/403, 428/404; 524/700, 783, 801, 847, 849, 497
See application file for complete search history.

(56) References Cited

U.S. PATENT DOCUMENTS

| | | | |
|---|---|---|---|
| 3,419,517 A * | 12/1968 | Hedrick et al. ............. 523/213 |
| 4,060,511 A | 11/1977 | Sinclair et al. | |
| 4,314,932 A * | 2/1982 | Wakimoto et al. .......... 524/430 |
| 4,330,460 A * | 5/1982 | Hoffend et al. ............. 524/849 |
| 4,421,660 A * | 12/1983 | Solc nee Hajna ........ 252/62.54 |
| 4,500,658 A * | 2/1985 | Fox ............................ 523/117 |
| 4,960,816 A * | 10/1990 | Rice ........................... 524/425 |
| 5,663,224 A * | 9/1997 | Emmons et al. ............ 524/188 |
| 5,883,173 A * | 3/1999 | Elspass et al. ............. 524/446 |
| 6,028,127 A * | 2/2000 | Yanagase et al. .......... 523/171 |
| 6,123,927 A * | 9/2000 | Ogawa et al. ............... 424/59 |
| 6,146,762 A * | 11/2000 | D'Herbecourt et al. ..... 428/404 |
| 6,458,458 B1 * | 10/2002 | Cooke et al. ............... 428/407 |

FOREIGN PATENT DOCUMENTS

FR    2 674 251 A1    9/1992
JP    05-115772    5/1993

* cited by examiner

*Primary Examiner*—Monique R. Jackson
(74) *Attorney, Agent, or Firm*—Sughrue Mion, PLLC

(57) ABSTRACT

There are provided inorganic/polymer composite particles having good UV-scattering efficiency and improved dispersion stability in organic formulation; and a method for preparing the same, which comprises the following steps of
(1) dispersing hydrophobic-treated inorganic particles in monomer and then adding initiator thereto;
(2) emulsifying the inorganic dispersion of step (1) in presence of surfactant and dispersion stabilizer; and
(3) suspension polymerizing the inorganic/monomer emulsion of step (2), to give inorganic/polymer composite particles.

14 Claims, 3 Drawing Sheets

US 7,247,378 B2

UV-SCATTERING INORGANIC/POLYMER COMPOSITE PARTICLES AND A METHOD FOR PREPARING THE SAME

BACKGROUND OF THE INVENTION

1. Field of the Invention

The present invention relates generally to UV-scattering inorganic/polymer composite particles and a method for preparing the same.

2. Description of the Related Arts

Recently, we have been worried about destruction of ozone layer and thereby increase of harmful ultraviolet (UV) to seriously affect on ecosystem. Particularly, cosmetic field or coating or painting field are concerned on this increase of harmful UV. That is, because UV penetrated into the skin causes melanoma or erythema, cosmetic field has a task to develop cosmetics for blocking UV.

Conventionally, UV-absorbing materials and UV-scattering materials have been formulated in separate or in combination, in order to block a contact of UV and the skin. UV-absorbing materials are compounds having π-conjugate molecular structure and having UV-blocking efficiency by absorbing UV and then by radiating transformed secondary energy. But, these compounds have defect to limit the amount used due to their toxic characters.

Further, as UV-scattering materials, extreme fine titanium dioxide and zinc oxide have been representatively employed. But, these inorganic UV-scattering particles have high density and high polarity to cause phase separation such as sedimentation and coagulation in organic mixture. Particularly, in UV-blocking cosmetics, this phase separation may depreciate UV-blocking efficiency and rapidly down stability of formulation. Because 15~30 nm of inorganic particles have high surface polarity and density, they cannot be dispersed stably in hydrophobic monomer phase of suspension polymerization. Additionally, when large quantity of inorganic particles is applied on the skin, it causes whitening phenomenon wherein the skin seems white or blue. This whitening phenomenon may depreciate the value of cosmetic goods to cause people to shun use of UV-blocking cosmetics. And, there is defect such as sticky feeling by using nano-sized inorganic particles.

Therefore, in order to solve the above problems caused by inorganic scattering materials, various efforts have been made. For examples, in order to improve stability in formulation, inorganic particles may be coated with organic materials or surfactant and formulation property may be controlled. Concretely, U.S. Pat. Nos. 6,123,927 and 5,980,871 disclosed a method for improving UV-scattering efficiency and formulation stability by controlling component ratio and particle size. But, though initial dispersion is improved, it is impossible to overcome low compatibility with other components in formulation and thereby impossible to improve long-term stability and temperature stability. Korean Patent No. 275022 expected synergistic effect by encapsulating titanium dioxide and transformed micro-hollow sphere with polymer micro-sphere. But, it cannot solve the defects caused by titanium dioxide.

Under this circumstance, in order to solve said problems, the present inventors have conducted extensive studies on novel material having intrinsic UV-scattering efficiency and without said defects caused by inorganic particles. As a result thereof, we found that inorganic/polymer composite particles obtained by suspension polymerization of monomer and inorganic particles exhibit improved UV-scattering efficiency and good dispersion stability. In the present method, inorganic particles are employed after surface treatment with organic material in order to increase dispersivity in monomer.

SUMMARY OF THE INVENTION

Therefore, one object of the present invention is to provide inorganic/polymer composite particles having improved UV-scattering efficiency and good dispersion stability.

Another object of the present invention is to provide a method for preparing said inorganic/polymer composite particles.

A further object of the present invention is to provide cosmetic compositions containing said inorganic/polymer composite particles.

These and other objects and advantages of the invention will become apparent to the skilled in the art from the following detailed description as considered in conjunction with the accompanying drawings.

DETAILED DESCRIPTION OF THE INVENTION

Figure 1:
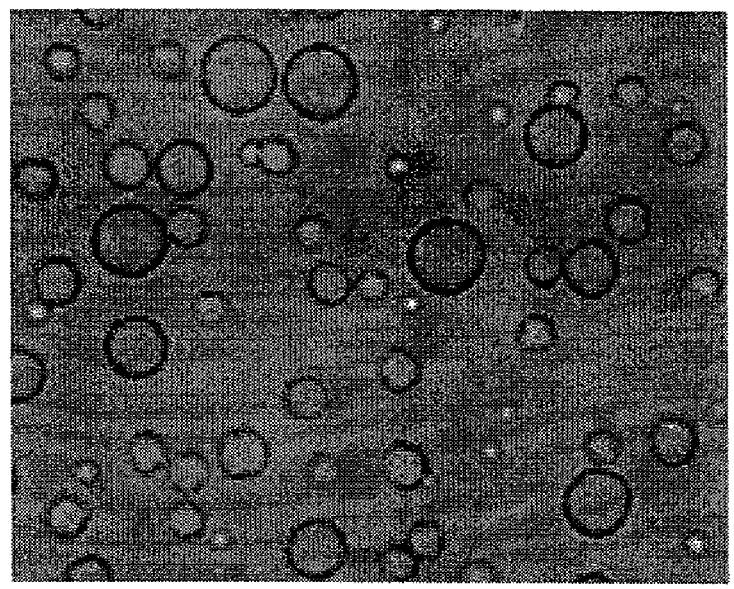
FIG. 1 is an optical microphotograph showing pure polymethylmethacrylate particles (Julymer MB1:PMMA) which have been conventionally used (×500).

The following is a detailed description of the present invention.

In order to achieve the above objects, the present invention is characterized in that inorganic/polymer composite particles are obtained by suspension polymerization of monomer and inorganic particles of which surfaces are treated with organic material. The obtained composite particles have the structure that inorganic particles are dispersed within polymer particle.

In detail, the method for preparing inorganic/polymer composite particles according to the present invention comprises the following steps of (1) dispersing hydrophobic-treated inorganic particles in monomer and then adding initiator thereto;

(2) emulsifying the inorganic dispersion of step (1) in presence of surfactant and dispersion stabilizer; and (3) suspension polymerizing the inorganic/monomer emulsion of step (2), to give inorganic/polymer composite particles.

The inorganic/polymer composite particles provided by the present invention are novel UV-scattering materials which solve the defects such as low dispersivity, whitening phenomenon and sticky feeling.

Hereinafter, the present method for preparing inorganic/polymer composite particles will be described in more detail.

Step (1) of Dispersing Hydrophobic-Treated Inorganic Particles in Monomer and Then Adding Initiator Thereto:

Because 15~30 nm of inorganic particles conventionally used as a UV-scattering agent have high surface polarity and density, not to be dispersed stably in monomer phase, the present invention employs hydrophobic-treated inorganic particles of which surfaces are primarily treated with organic material.

An organic material employed in surface treatment of inorganic particles may be selected from the group consisting of saturated or unsaturated fatty acids having 5~30 of carbon number such as lauric acid, oleic acid, cetylic acid and stearic acid; organic silane derivatives having tetraethoxysilane group and containing said fatty acids; reactive silane derivatives having tetraethoxysilane group and containing unsaturated double bond in main chain or its end; polymer such as polystyrene and its derivatives, polymethylmethacrylate and its derivatives, polyvinylacetate and its derivatives, polyacrylate and its derivatives and polyacrylonitrile and its derivatives; and copolymer therebetween.

Inorganic particles such as titanium dioxide and zinc oxide which have been conventionally used as a UV-scattering agent may be surface treated with said organic material. For surface treatment, physical/chemical adsorption or covalent bonding may be employed.

Further, the inorganic particles primarily treated with said organic material may be secondarily treated with dimethicone chain.

Surface-treated inorganic particles may be preferably dispersed in monomer in an amount of 30~50% by weight based on the total weight of composite particles. If the amount is less than 30 wt %, it may be impossible to sufficiently exhibit unique function such as UV-scattering. And, if the amount is more than 50 wt %, there may be limitation in combining inorganic/polymer due to phase volume effect. Maximum amount depends on characters of monomer selected. This is because compatibility between monomer mixture forming primary consecutive phase and surface of inorganic particles determines gelling point and loading amount.

In the present invention, surface-treated inorganic particles may be employed independently or in combination of other inorganic particles by mixing dispersion.

A monomer employed in dispersing inorganic particles may, if it is capable of radical polymerization, not be limited to specific kind. Preferably, it may be selected from the group consisting of styrene, p- or m-methylstyrene, p- or m-ethylstyrene, p- or m-chlorostyrene, p- or m-chloromethylstyrene, styrenesulfonic acid, p- or m-t-butoxystyrene, methyl(meth)acrylate, ethyl(meth)acrylate, propyl(meth)acrylate, n-butyl(meth)acrylate, isobutyl(meth)acrylate, t-butyl(meth)acrylate, 2-ethylhexyl(meth)acrylate, n-octyl(meth)acrylate, lauryl(meth)acrylate, stearyl(meth)acrylate, 2-hydroxyethyl(meth)acrylate, polyethylene glycol (meth)acrylate, methoxypolyethylene glycol (meth)acrylate, glycidyl(meth)acrylate, dimethylaminoethyl(meth)acrylate, diethylaminoethyl(meth)acrylate, vinyl acetate, vinyl propionate, vinyl butyrate, vinyl ether, allylbutyl ether, allylglycidyl ether, (meth)acrylic acid, maleic acid, alkyl(meth)acrylamide and (meth)acrylonitrile.

Further, an oil-soluble initiator is added in this step, in order to perform polymerization of inorganic/monomer emulsion within liquid droplet of emulsion in hereafter step. As an initiator employed in the present invention, it may be peroxides such as benzoyl peroxide, lauryl peroxide, o-chlorobenzoyl peroxide, o-methoxybenzoyl peroxide, t-butylperoxy-2-ethylhexanoate, t-butylperoxy isobutyrate, 1,1,3,3-tetramethylbutylperoxy-2-ethylhexanoate, dioctanoyl peroxide and didecanoyl peroxide; and azo compounds such as 2,2-azobisisobutyronitrile, 2,2-azobis(2-methylbutyronitrile) and 2,2-azobis(2,4-dimethylvaleronitrile). Initiator may be preferably used in an amount of 0.1~3% by weight based on the total weight of monomer.

Step (2) of Emulsifying the Inorganic Dispersion of Step (1) in Presence of Surfactant and Dispersion Stabilizer:

In the present invention, a surfactant is employed in order to control sedimentation or coagulation of inorganic/monomer emulsion. Generally, anionic surfactant may be employed. For example, alkyl sulfate, aryl sulfate, alkali sulfate, sulfonate, phosphate or succinate and their ethoxy derivatives may be included. And, nonionic surfactant such as polyoxyethylene alkyl ether, polyoxyethylene alkyl phenol ether and polyethylene glycol may be admixed with said anionic surfactant. Surfactant may be selected depending on particle size of composite particles to be prepared and preferably employed in an amount of 0.1~5% by weight based on the total weight of dispersion.

Further, a dispersion stabilizer employed in the present invention may be water-soluble polymer. Preferably, it may include gelatin, starch, hydroxyethyl cellulose, carboxymethyl cellulose, polyvinylpyrrolidone, polyvinylalkyl ether, polyvinyl alcohol, polydimethyl siloxane/polystyrene block copolymer, etc. It may be employed in an appropriate amount to inhibit sedimentation or coagulation of polymer particles obtained in dispersion polymerization. Preferably, it may be added in an amount of 1~5% by weight based on the total weight of dispersion. If the amount is less than 1 wt %, the stabilizer may not be sufficiently adsorbed on liquid droplet of emulsion, not to inhibit coagulation. And, if the amount is more than 5 wt %, viscosity of the dispersion system may increase rapidly.

Additionally, the inorganic dispersion may be diluted. A diluent employed may be solvent having dissolving power as for monomer, which will rapidly lessen after polymerization terminates. Preferably, it may include linear alkanes such as hexane, heptane, octane, nonane and decane; alcohols having 4~10 of carbon number such as butanol, linear or branched pentanol, hexanol, heptanol, octanol, nonanol and decanol; alkyl esters having 7 or more of carbon number such as n-hexyl acetate, 2-ethylhexyl acetate, methyl oleate, dibutyl sebacate, dibutyl adipate and dibutyl carbamate; aliphatic ketones such as methylisobutyl ketone and isobutyl ketone; aromatic hydrocarbons such as benzene, toluene and o- or p-xylene; etc.

Step (3) of Suspension Polymerizing the Inorganic/Monomer Emulsion of Step (2), to Give Inorganic/Polymer Composite Particles:

In this step, inorganic/monomer emulsion is suspension polymerized in presence of the initiator added in step (1) and crosslinking agent.

A crosslinking agent added may, if it is capable of radical polymerization, not be limited to specific kind. Preferably, it may be selected from the group consisting of divinylbenzene, 1,4-divinyloxybutane, divinylsulfone, diallylphthalate, diallylacrylamide, triallyl(iso)cyanurate, triallyltrimellitate, (poly)ethylene glycol di(meth)acrylate, (poly)propylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate and glycerol tri(meth)acrylate. Because the concentration of said crosslinking agent may influence on morphology of composite particles and polymerization degree, it may be preferable to limit the amount of crosslinking agent employed in a range of 0.1~50% by weight based on the total weight of monomer.

Suspension polymerization may be performed by a conventional method in this art.

In consideration of conversion ratio, polymerization must be performed at a temperature of 70° C. or higher for long time. However, in this condition, inorganic compounds in the surface of inorganic particles may be detached. Therefore, it is important to carefully select polymerization temperature. The present invention may preferably limit polymerization temperature in a range of 70° C. or lower.

The obtained inorganic/polymer composite particles may be incorporated into UV-blocking cosmetic composition in an amount of 0.1~10% by weight based on the total weight of composition. If the amount is less than 0.1 wt %, it may be difficult to obtain UV-blocking effect. And, if the amount is more than 10 wt %, formulation may be unstable.

PREFERRED EMBODIMENT OF THE INVENTION

The present invention will be described in more detail by way of the following examples, which should not be considered to limit the scope of the present invention.

EXAMPLE 1

Titanium dioxide/polymethylmethacrylate composite particles were prepared in the following process.

As titanium dioxide, Micro $TiO_2$ MT-100T (provided by Tri-K(USA)) wherein titanium dioxide particles were primarily surface treated with stearic acid was employed. The titanium dioxide particles were dispersed in methylmethacrylate monomer under irradiation of ultrasonic wave. The amounts of titanium dioxide were changed 0, 10, 30 and 50 wt %, respectively. As a crosslinking agent, ethylene glycol dimethacrylate was added in an amount of 15 wt % based on the weight of monomer. Then, as an initiator, 2,2'-azobis(2-methylbutyronitrile) was added thereto in an amount of 1 wt % based on the weight of monomer. The titanium dioxide/methylmethacrylate mixture was added into aqueous solution where 2 wt % of polyvinyl alcohol with 87~89% of saponification value and 0.5 wt % of sodium laurylsulfate were dissolved. And then the mixture was emulsified under 5,000 rpm of shear stress for 3 minutes. Subsequently, the reactor was heated to 50° C. and polymerization was performed for 10 hours. After termination, the resultant was centrifuged to remove residue reactant and dispersion stabilizer by washing with ethanol/distilled water mixture several times and then dried on vacuum oven for 24 hours, to give titanium dioxide/polymethylmethacrylate composite particles, as powders.

EXAMPLE 2

The procedure described in Example 1 was followed, except that Mibrid powder SA-TTO-S-4 (provided by Miyoshi(Japan)) wherein titanium dioxide particles were primarily surface treated with stearic acid and then dimethicone chain was added into 10% of surface to give titanium dioxide/polymethylmethacrylate composite particles.

EXAMPLE 3

The procedure described in Example 2 was followed, except that heptane was added in the same amount as monomer into titanium dioxide/methylmethacrylate mixture, to give titanium dioxide/polymethylmethacrylate composite particles.

EXAMPLE 4

The procedure described in Example 1 was followed, except that zinc oxide was employed in place of the titanium dioxide to give zinc oxide/polymethylmethacrylate composite particles. The employed zinc oxide was Z-Cote (provided by SunSmart) wherein zinc oxide particles were primarily surface treated with stearic acid.

EXAMPLE 5

The procedure described in Example 1 was followed except that that zinc oxide was employed in place of the titanium dioxide to give zinc oxide/polymethylmethacrylate composite particles. The employed zinc oxide was Mibrid powder SAMT-UFZO-450 (provided by Miyoshi) wherein zinc oxide particles were primarily surface treated with stearic acid and then dimethicone chain was added into 13% of surface.

EXAMPLE 6

The procedure described in Example 5 was followed, except that heptane was added in the same amount as monomer into zinc oxide/methylmethacrylate mixture, to give zinc oxide/polymethylmethacrylate composite particles.

EXAMPLE 7

The procedure described in Example 1 was followed, except that component ratio of titanium dioxide and zinc oxide was changed to give titanium dioxide/zinc oxide/polymethylmethacrylate composite particles. The titanium dioxide and the zinc oxide were Mibrid powders (provided by Miyoshi) which were employed in Example 2 and Example 5, respectively.

EXAMPLE 8

The procedure described in Example 7 was followed, except that heptane was added in the same amount as monomer into titanium dioxide/zinc oxide/methylmethacrylate mixture, to give titanium dioxide/zinc oxide/polymethylmethacrylate composite particles.

COMPARATIVE EXAMPLE 1

The procedure described in Example 1 was followed, except that non-treated titanium dioxide particles of Micro $TiO_2$ MT-500B (provided by Tri-K) were employed to give titanium dioxide/polymethylmethacrylate composite particles.

EXPERIMENTAL EXAMPLE 1

Morphology of the titanium dioxide/polymethylmethacrylate composite particles obtained in Examples 2 and 3 was observed by optical microscope. The results are shown in FIGS. 1 to 3.

Figure 2:
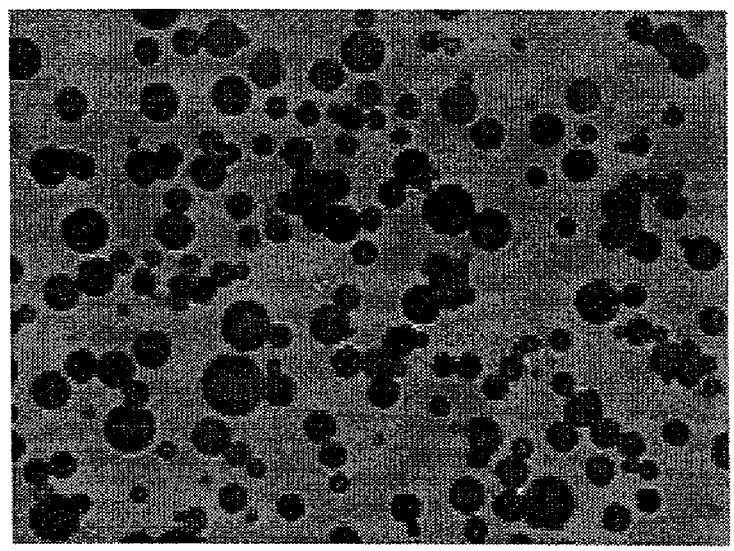
FIG. 2 is an optical microphotograph showing the titanium dioxide(30 wt % contained)/polymethylmethacrylate composite particles prepared in the present invention (×500).

As shown in FIG. 1, pure polymethylmethacrylate particles without titanium dioxide added transmit light to form uniform phase. In case of the composite particles, as shown in FIG. 2, titanium dioxide uniformly coated with polymethacrylate phase scatters light to show dark. These results confirm that combination of titanium dioxide and polymethylmethacrylate was successful.

Figure 3:
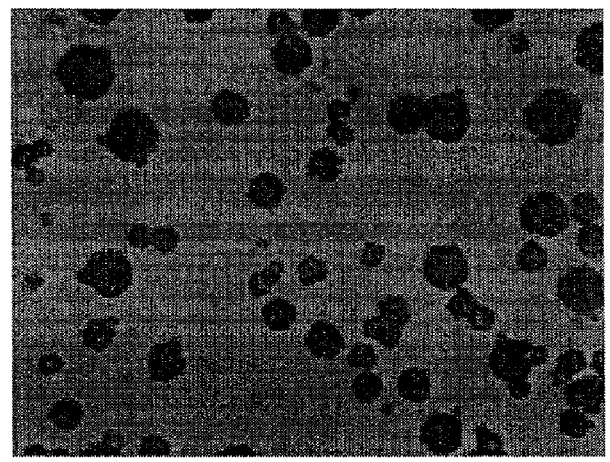
FIG. 3 is an optical microphotograph showing the porous titanium dioxide(50 wt % contained)/polymethylmethacrylate composite particles prepared in the present invention (×500).

And, FIG. 3 is an optical microphotograph showing the porous titanium dioxide/polymethylmethacrylate composite particles containing 50 wt % of titanium dioxide. Regardless of porosity, combination was successful. And, winding surface was lightly observed by porosity.

The characters of the titanium dioxide/polymethylmethacrylate composite particles obtained in Examples 2 and 3 are shown in Table 1.

TABLE 1

| Amount of titanium dioxide (wt %) | Mean particle size (μm) | Size distribution index | Outflow rate of titanium dioxide (%) | Structure |
|---|---|---|---|---|
| 0 | 6.5 | 1.3 | — | Monolithic |
| 10 | 7.0 | 1.4 | 1.2 | Monolithic |
| 30 | 7.5 | 1.3 | 1.0 | Monolithic |
| 50 | 10.0 | 1.4 | 1.4 | Porous |

Figure 4:
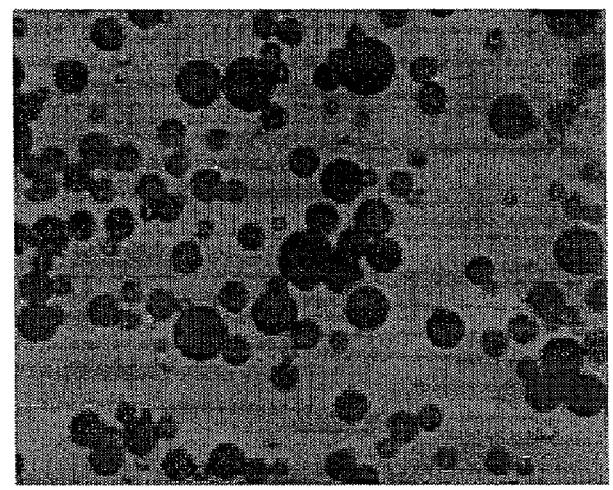
FIG. 4 is an optical microphotograph showing the zinc oxide(30 wt % contained)/polymethylmethacrylate composite particles prepared in the present invention (×500).

Additionally, the zinc oxide/polymethylmethacrylate composite particles obtained in Examples 5 and 6 exhibited similar particle-formation behavior to that of titanium dioxide composite particles. FIG. 4 is an optical microphotograph showing the zinc oxide/polymethylmethacrylate composite particles containing 30 wt % of zinc oxide and the characters are shown in Table 2.

TABLE 2

| Amount of zinc oxide (wt %) | Mean particle size (μm) | Size distribution index | Outflow rate of zinc oxide (%) | Structure |
|---|---|---|---|---|
| 0 | 6.5 | 1.3 | — | Monolithic |
| 10 | 8.0 | 1.5 | 1.2 | Monolithic |
| 30 | 7.0 | 1.4 | 1.0 | Monolithic |
| 50 | 8.5 | 1.4 | 1.4 | Porous |

Figure 5:
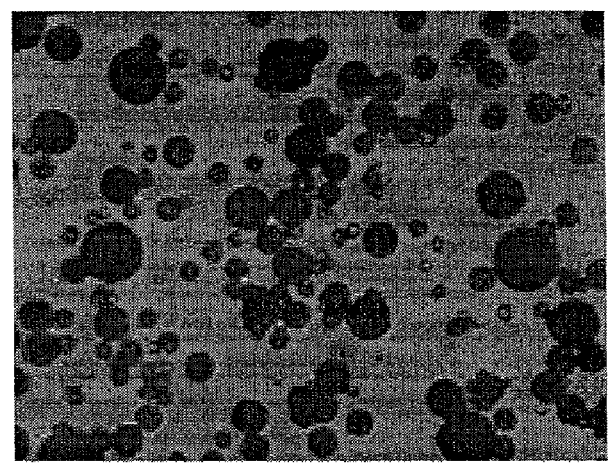
FIG. 5 is an optical microphotograph showing the porous titanium dioxide/zinc oxide/polymethylmethacrylate composite particles prepared in the present invention (×500).

The characters of the titanium dioxide/zinc oxide/polymethylmethacrylate composite particles obtained in Examples 7 and 8 are shown in Table 3 and FIG. 5 is an optical microphotograph thereof. In case of titanium dioxide/zinc oxide/polymethylmethacrylate composite particles, there is no difference in morphology and stability.

TABLE 3

| Weight ratio of titanium dioxide/ zinc oxide (wt/wt) | Mean particle size (μm) | Size distribution index | Outflow rate of titanium dioxide/ zinc oxide (%) | Structure |
|---|---|---|---|---|
| 1/0 | 7.5 | 1.3 | 1.0 | Monolithic |
| 2/1 | 7.5 | 1.3 | 1.7 | Monolithic |
| 4/1 | 7.0 | 1.5 | 1.0 | Monolithic |
| 4/1 | 6.5 | 1.4 | 1.4 | Porous |

EXPERIMENTAL EXAMPLE 2

In order to confirm the effectiveness of surface treatment, particle characters, viscosities and sedimentation stabilities of the inorganic/polymer composite particles obtained in Examples 1~2 and Comparative Example 1 were observed. The results are shown in Table 4.

TABLE 4

| Surface treatment of Titanium dioxide | Amount of titanium dioxide (wt %) | Mean particle size (μm) | Outflow rate of titanium dioxide (%) | Viscosity | Sedimentation stability | Structure |
|---|---|---|---|---|---|---|
| Comp. Ex. 1 (non-treated) | 10 | — | 100 | 1,050 | 55 | Bimodal aggregation |
| Ex. 1 (1st treatment) | 10 | 6.0 | 16.8 | 2,200 | 89 | Monolithic |
| Ex. 2 (1st and 2nd treatments) | 10 | 7.0 | 1.2 | 2,750 | 100 | Monolithic |

The results of Table 4 confirm that surface treatment of inorganic particles decisively contributes to dispersion stability of inorganic particles in dispersion or polymerization processes. Non-treated titanium dioxide particles were not dispersed in monomer phase at all and in polymerization process, all the particles flowed out and coagulated. On the contrary, the inorganic particles with primary stearic acid-surface treatment were relatively well dispersed in monomer phase. And, in case of the primarily-treated inorganic particles with dimethicone chain added, viscosity is about 2~3 times as compared with that of non-treated particles and in sedimentation test, drop of stability was not observed. Therefore, the results confirm that hydrophobic chain such as dimethicone chain added into the surface of inorganic particles can be effectively orientated in monomer phase and thereby improve dispersion stability, so to prevent inorganic particles from flowing out in polymerization process. Consequently, an excess quantity of inorganic particles can be uniformly dispersed in polymer particles, to give stable composite particles.

FORMULATION 1 AND COMPARATIVE FORMULATION 1

In order to evaluate dispersion stability of the inorganic/polymer composite particles obtained in said examples, W/O emulsion type cosmetics for UV-blocking containing conventional inorganic particles and the composite particles of Example 5 were formulated, respectively. The basic compositions are shown in Table 5 and the amounts of inorganic particles are same in two formulations.

The inorganic particles or the composite particles of Example 5 were completely dispersed in oily phase with other materials mixed uniformly, and then aqueous phase was gradually added thereto. The resultant was emulsified under 7,000 rpm of shear stress for 5 minutes and gradually stirred to cool to the room temperature.

TABLE 5

| Materials | Content (wt %) | |
|---|---|---|
| | Comparative Formulation 1 | Formulation 1 |
| Microcrystalline wax | 3.0 | 3.0 |
| Liquid paraffin | 7.0 | 7.0 |
| Silicone oil | 6.0 | 6.0 |
| Cyclopentasilicone | 6.0 | 6.0 |
| Paraben | 0.1 | 0.1 |
| Cetyldimethicone copolyol | 2.0 | 2.0 |
| $TiO_2$ | 2.0 | — |
| ZnO | 0.5 | — |
| Zinc oxide/polymethylmethacrylate composite paticles of Ex. 5 | — | 8.33 |
| Ethylhexylmethoxycinnamate | 7.0 | 7.0 |
| Butylene glycol | 5.0 | 5.0 |
| Distilled water | 61.4 | 55.57 |

FORMULATION 2 AND COMPARATIVE FORMULATION 2

In order to evaluate dispersion stability of the inorganic/polymer composite particles in another formulation, O/W emulsion type cosmetics for UV-blocking containing conventional inorganic particles and the composite particles of Example 5 were formulated, respectively. The basic compositions are shown in Table 6 and the amounts of inorganic particles are same in two formulations.

The inorganic particles or the composite particles of Example 5 were completely dispersed in oily phase with other materials mixed uniformly, and then gradually added into aqueous phase. The resultant was emulsified under 7,000 rpm of shear stress for 5 minutes and gradually stirred to cool to the room temperature.

TABLE 6

| Materials | Content (wt %) | |
|---|---|---|
| | Comparative Formulation 2 | Formulation 2 |
| Beeswax | 2.0 | 2.0 |
| Stearyl alcohol | 1.5 | 1.5 |
| Stearic acid | 0.5 | 0.5 |
| Squalane | 10.0 | 10.0 |
| Propylene glycol monostearate | 3.0 | 3.0 |
| Polyoxyethylene ethyl ether | 1.0 | 1.0 |
| Ethylhexylmethoxycinnamate | 7.0 | 7.0 |
| Paraben | 0.1 | 0.1 |
| $TiO_2$ | 2.0 | — |
| ZnO | 0.5 | — |
| Zinc oxide/polymethylmethacrylate composite paticles of Ex. 5 | — | 8.33 |
| Propylene glycol | 8.0 | 8.0 |
| Glycerine | 4.0 | 4.0 |
| Triethylamine | 1.0 | 1.0 |
| Distilled water | 59.4 | 53.57 |

EXPERIMENTAL EXAMPLE 3

In order to evaluate dispersion stability of the inorganic/polymer composite particles of the present invention, UV-blocking cosmetics of Formulations 1~2 and Comparative Formulations 1~2 were preserved at a temperature of 45° C. and then coagulation and sedimentation thereof were observed.

In results, in the cosmetics containing the conventional inorganic particles of Comp. Formulations 1~2, coagulation and sedimentation of inorganic compounds were observed, regardless of kind of formulation. On the contrary, in the cosmetics containing the composite particles of Formulations 1~2, phase separation of the formulations such as coagulation and sedimentation was not observed at all, after long terms of preservation (about 10 weeks). And, the same results are obtained at a temperature of 50° C. or higher.

EXPERIMENTAL EXAMPLE 4

In order to examine whitening phenomenon of the cosmetics, W/O emulsion type cosmetic formulations in the composition of Table 5 were prepared respectively, by containing, as inorganic particles, 3 wt % of titanium dioxide and the titanium dioxide(10 wt % contained)/polymethylmethacrylate composite particles in an amount to be same quantity of titanium dioxide.

Same quantity of the formulation sample was applied on the glass and then whitening phenomenon was observed by means of microscope. The results are shown in FIG. 6.

Figure 6A:
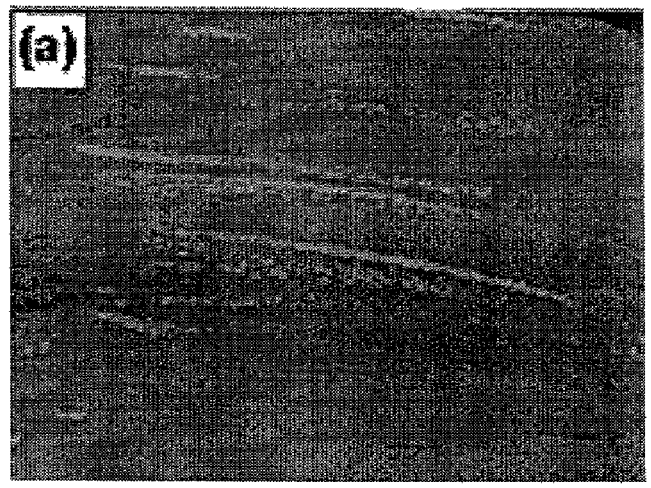
FIG. 6a is a microphotograph showing the cosmetic formulation containing 3 wt % of titanium dioxide which has been conventionally used.
Figure 6B:
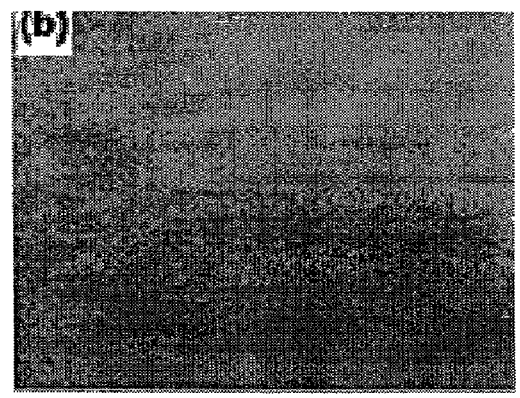
FIG. 6b is a microphotograph showing the cosmetic formulation containing the titanium dioxide(10 wt % contained)/polymethylmethacrylate composite particles prepared in the present invention.

As shown in FIG. 6a, in the cosmetic formulation containing 3 wt % of titanium dioxide, whitening phenomenon was distinctly observed. On the contrary, in the cosmetic formulation containing the titanium dioxide/polymethylmethacrylate composite particles, negligible slight whitening phenomenon was observed as shown in FIG. 6b. These results are because the size of inorganic particles is distributed in the fine region of about 6~7 micron. UV-scattering cosmetics containing these composite particles, similar to the cosmetics non-containing titanium dioxide, exhibit mild feeling on the skin.

EXPERIMENTAL EXAMPLE 5

In order to evaluate UV-blocking efficiency of the present invention, SPF (Sun Protection Factor) was measured by means of SPF analyzer (provided by OptoMatrix(USA)). In results, the titanium dioxide/polymethylmethacrylate composite particles obtained in Examples 1~2 exhibits about 10~20% down of SPF in the content to be same quantity of titanium dioxide. The zinc oxide/polymethylmethacrylate composite particles obtained in Examples 3~4 exhibits about 5~10% down of SPF in the content to be same quantity of zinc oxide. And, the titanium dioxide/zinc oxide/polymethylmethacrylate composite particles obtained in Examples 5~6 exhibits about 5% down of SPF in the content to be same quantity of titanium dioxide/zinc oxide. These results show that the composite particles of the present invention have similar level of UV-blocking efficiency to that of simple inorganic particles. And, there is no difference in SPF depending on surface area.

As shown by the above description, the inorganic/polymer composite particles provided by the present invention are novel UV-scattering materials that solve the defects such as unstable dispersion, whitening phenomenon and sticky feeling. Because UV-blocking efficiency depends on light scattering, the present composite particles can be applied to UV-blocking cosmetics. Additionally, the composite particles are expected to be applied to aqueous paintings which have had defects such as unstable dispersion by using conventional inorganic pigments. Further, because the polymethylmethacrylate forming the surface of the present composite particles has high compatibility with other polymers, the present invention is expected to exhibit good effects in compounding and strengthening of polymers.

Although preferred embodiments of the present invention have been described in detail hereinabove, it should be clearly understood that many variations of the basic inventive concepts herein taught which may appear to those skilled in the art will still fall within the spirit and scope of the present invention as defined in the appended claims.

The invention claimed is:

1. A composite particle comprising a polymer particle and inorganic particles entrapped in said polymer particle, wherein said inorganic particles are titanium dioxide, zinc oxide or a mixture thereof and dispersed within said polymer particle, wherein said composite particle is obtained by suspension polymerization of an emulsion comprising a monomer and said inorganic particles, wherein said inorganic particles are surface-treated with an organic material prior to being mixed with the monomer for suspension polymerization,
   wherein said inorganic particles are primarily surface-treated with at least one organic materials selected from saturated or unsaturated fatty acids having 5-30 carbon atoms, and
   wherein said primarily surface-treated inorganic particles are secondarily surface-treated with a dimethicone chain.

2. The composite particle according to claim 1, which has the size of about 10 micrometer ($\mu$m) or less.

3. A method for preparing a composite particle comprising a polymer particle and inorganic particles entrapped in said polymer particle, said inorganic particles being dispersed within said polymer particle, which method comprises the following steps of
   (1) dispersing pre-surface-treated inorganic particles in a monomer and then adding an initiator thereto to give a dispersion, wherein said inorganic particles are titanium dioxides, zinc oxides or a mixture thereof;
   (2) emulsifying the dispersion of step (1) in the presence of a dispersion stabilizer; and
   (3) suspension polymerizing the resulting emulsion of step (2), to give the composite particles,
   wherein said inorganic particles in step (1) are primarily surface-treated with at least one organic materials selected from saturated or unsaturated fatty acids having 5-30 carbon atoms, and
   wherein said primarily surface-treated inorganic particles are secondarily surface-treated with a dimethicone chain.

4. The method according to claim 3, wherein said dispersion stabilizer is one or more selected from the group consisting of gelatin, starch, hydroxyethyl cellulose, carboxymethyl cellulose, polyvinylpyrrolidono, polyvinyl alkyl ether, polyvinyl alcohol and polydimethyl siloxane/polystyrene block copolymer.

5. The method according to claim 3, wherein said dispersion stabilizer is an anionic surfactant or an admixture of an anionic surfactant and a nonionic surfactant.

6. The method according to claim 5, wherein said anionic surfactant is one or more selected from the group consisting of alkyl sulfate, aryl sulfate, alkali sulfate, sulfonate, phosphate, succinate and their ethoxy derivatives.

7. The method according to claim 5, wherein said nonionic surfactant is selected from the group consisting of polyoxyethylene alkyl ether, polyoxyethylene alkyl phenol ether and polyethylene glycol.

8. The method according to claim 3, wherein said composite particle has the size of about 10 micrometer ($\mu$m) or less.

9. A UV-blocking cosmetic composition containing composite particles in an amount of 0.1-10% by weight based on the total weight of the composition, said composite particles having a structure that inorganic particles are dispersed within an individual polymer particle and being prepared by a method comprising the steps of:
   (1) dispersing inorganic particles in a monomer and then adding an initiator thereto to give a dispersion, wherein said inorganic particles are titanium dioxides, zinc oxides or a mixture thereof;
   (2) emulsifying the dispersion of step (1) in the presence of a dispersion stabilizer; and
   (3) suspension polymerizing the resulting emulsion of step (2), to give the composite particles,
   wherein said inorganic particles in step (1) are, prior to being dispersed in the monomer, primarily surface-treated with at least one organic materials selected from saturated or unsaturated fatty acids having 5-30 carbon atoms, and
   wherein said primarily surface-treated inorganic particles are, prior to being dispersed in the monomer, secondarily surface-treated with a dimethicone chain.

10. The UV-blocking cosmetic composition according to claim 9, wherein said dispersion stabilizer is one or more selected from the group consisting of gelatin, starch, hydroxyethyl cellulose, carboxymethyl cellulose, polyvinylpyrrolidone, polyvinylalkyl ether, polyvinyl alcohol and polydimethyl siloxane/polystyrene block copolymers.

11. The UV-blocking cosmetic composition according to claim 9, wherein said dispersion stabilizer is an anionic surfactant or an admixture of an anionic surfactant and a nonionic surfactant.

12. The UV-blocking cosmetic composition according to claim 11, wherein said anionic surfactant is one or more selected from the group consisting of alkyl sulfate, aryl sulfate, alkali sulfate, sulfonate, phosphate, succinate and their ethoxy derivatives.

13. The UV-blocking cosmetic composition according to claim 11, wherein said nonionic surfactant is selected from the group consisting of polyoxyethylene alkyl ether, polyoxyethylene alkyl phenol ether and polyethylene glycol.

14. The composition according to claim 9, wherein said composite particles have the size of about 10 micrometer ($\mu$m) or less.

* * * * *